(No Model.)
W. C. SMITH, T. M. RYLE & M. CRUM.
BAG FASTENER.
No. 301,294. Patented July 1, 1884.
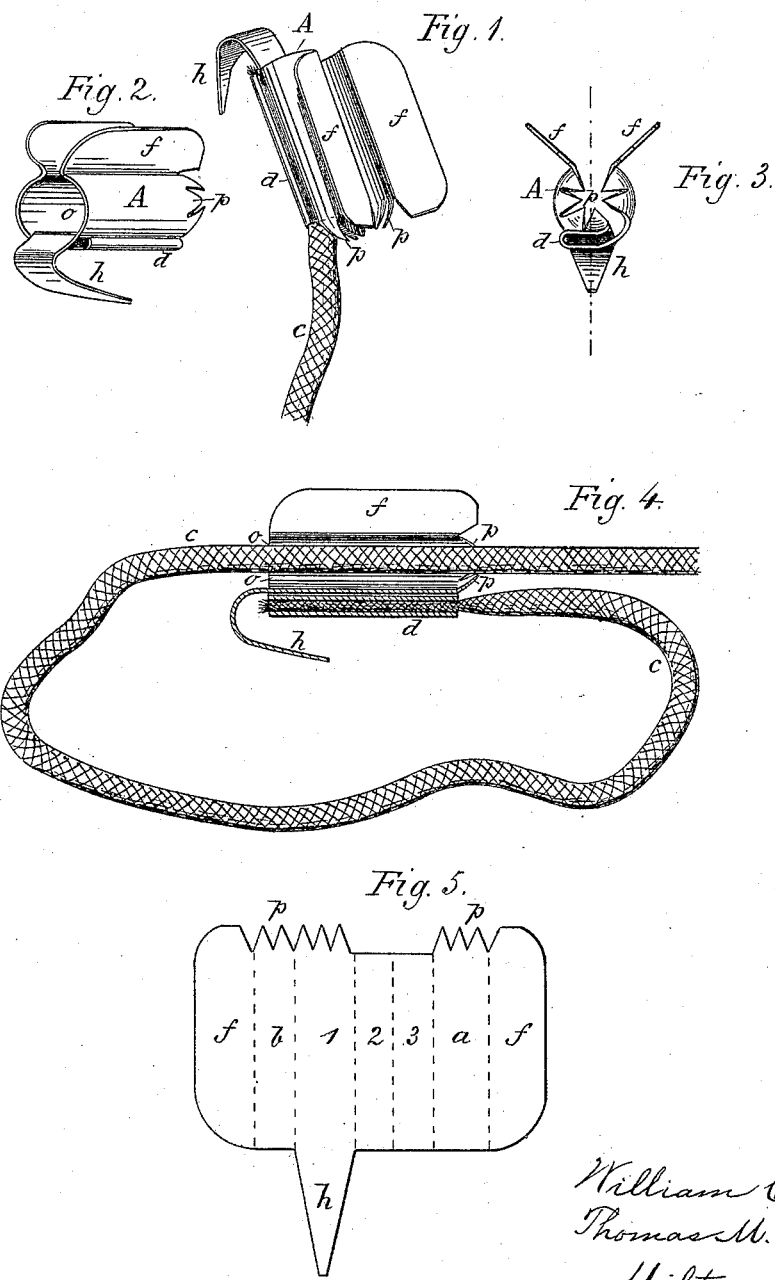
WITNESSES:
INVENTORS
BY
ATTORNEY

UNITED STATES PATENT OFFICE.

WILLIAM C. SMITH, THOMAS M. RYLE, AND MILTON CRUM, OF PATERSON, N. J.

BAG-FASTENER.

SPECIFICATION forming part of Letters Patent No. 301,294, dated July 1, 1884.

Application filed April 11, 1884. (No model.)

*To all whom it may concern:*

Be it known that we, WILLIAM C. SMITH, THOMAS M. RYLE, and MILTON CRUM, all of the city of Paterson, in the county of Passaic and State of New Jersey, have invented a new and useful Improvement in Bag-Fasteners, of which the following is a specification.

Our invention relates to that class of bag-fasteners which are detachable from the bag, and the object of our improvement is to provide a bag-fastener which may be attached to the bag and removed therefrom at pleasure without injuring the bag or in any wise impairing the usefulness of the fastener, and which may be operated without tying, buckling, or locking, and which may be drawn to any degree of tightness. We attain these objects by the device shown in the accompanying drawings, in which—

Figure 1 is a perspective view of the fastener comprising the holder and cord. Fig. 2 is a perspective view of the holder. Fig. 3 is a view of the holder, showing the points or prongs $p\,p$, hereinafter referred to. Fig. 4 is a vertical section of the holder, the cord being in elevation; and Fig. 5 illustrates how the holder may be stamped in one piece.

Similar letters refer to similar parts in the several figures.

A is a cylinder or holder open at the top along its entire length, and having its sides prolonged so as to form the wings or flanges $f\,f$, as shown in Figs. 1, 2, 3, and 4. One end of the cylinder is open, as shown at O in Fig. 2, while the other end is partially closed by the prongs or teeth $p\,p$, as shown in Figs. 1, 2, 3, and 4. On the under side of the cylinder or holder A, and at the open end of the same, is a hook, $h$. C is a cord which is attached to the holder A, as hereinafter described. The holder A may be made of any metal, and can be stamped in one piece, as shown in Fig. 5. The dotted lines in Fig. 5 indicate where the folds are to be made in giving the shape shown in Fig. 1. Thus the section numbered 2 is folded under the section numbered 1, and the section numbered 3 is folded back again under section numbered 2, thereby bringing the edge of the section lettered $a$ into contact with the edge of section numbered 1. The three sections $a$, $b$, and 1 thus form the body of the cylinder, while sections $f\,f$ form the flanges above referred to. After the holder has been cut out in the flat, as shown in Fig. 5, it is stamped into the shape shown in Fig. 1, as above described, the cord C being attached at the same time by having its end folded in between the sections 2 and 3, as shown at $d$ in Fig. 4. The prongs or teeth $p\,p$ should be drawn toward a center, so as nearly to close the end of the cylinder, as shown in Fig. 3.

In using the device above described the hook $h$ is inserted in the bag, and the cord C, having been passed around the gathered mouth of the bag, is passed through the cylinder A and drawn as tightly as may be desired, the prongs $p\,p$ holding it firmly in place, thus securely fastening the bag without further manipulation. The flanges $f\,f$ act as guides to direct the cord C into the cylinder A.

By means of the hook $h$ the device is held in position, so that the holder cannot slip or be pulled from the bag.

The fastener may be easily removed by lifting the cord C out of the cylinder at its open end O, and releasing the cord from the prongs $p\,p$.

The advantages of our fastener are that no tying, buckling, or locking is necessary, nor is it requisite to have any swells or knots in the cord, or other especially prepared tie. Again, in our device the cord may be caught and held at any place, and is not limited to certain points, as is the case where links or cords provided with knots or swells are used. All that is necessary to operate our device is to insert the hook $h$ into the bag, pass the cord around the gathered mouth of the bag and through the holder A, and draw the cord as tightly as may be desired and the fastening is accomplished.

We do not intend to limit ourselves to the particular form of holder above described; nor is it necessary to use a cord, as any flexible tie capable of being held by the prongs $p\,p$ may be used. Neither do we wish to confine ourselves to the particular manner herein described of attaching the cord to the holder. Instead of being attached to the under part of the holder, as above explained, it may be fastened to one of the flanges, or be tied to the holder through a perforation or in any other suitable manner.

What we claim, and desire to secure by Letters Patent, is—

1. A bag-fastener consisting of the combination of a cord with a holder provided with a hook, for the purpose of securing the holder to the bag, and points or prongs for the purpose of holding the cord taut when the bag is fastened, substantially as and for the purposes set forth and described.

2. In a bag-fastener, a hollow holder open at the top along its entire length, having its sides prolonged to form the wings or flanges $ff$, and provided with the hook $h$ and points or prongs $p\ p$, in combination with a cord or other flexible tie, substantially as and for the purposes set forth and described.

WILLIAM C. SMITH.
THOMAS M. RYLE.
MILTON CRUM.

Witnesses:
NATHANIEL T. SMITH,
LOUIS V. HAROLD.